(12) United States Patent
Moriya et al.

(10) Patent No.: US 11,776,105 B2
(45) Date of Patent: Oct. 3, 2023

(54) CONTAMINANT DETECTION SYSTEM, CONTAMINANT DETECTING METHOD, AND SEMICONDUCTOR MANUFACTURING APPARATUS

(71) Applicant: Tokyo Electron Limited, Tokyo (JP)

(72) Inventors: Tsuyoshi Moriya, Tokyo (JP); Yoshitaka Enoki, Iwate (JP); Tokio Toyama, Boise, ID (US); Michihiro Takahashi, Iwate (JP); Takuya Mori, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 17/223,349

(22) Filed: Apr. 6, 2021

(65) Prior Publication Data
US 2021/0327045 A1 Oct. 21, 2021

(30) Foreign Application Priority Data
Apr. 17, 2020 (JP) .................................. 2020-074356

(51) Int. Cl.
*G06T 7/00* (2017.01)
*G06T 11/00* (2006.01)
*G06T 7/70* (2017.01)

(52) U.S. Cl.
CPC .............. *G06T 7/0004* (2013.01); *G06T 7/70* (2017.01); *G06T 11/001* (2013.01); *G06T 2207/10024* (2013.01); *G06T 2207/10064* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 6,221,592 B1 * | 4/2001 | Schwartz | C12Q 1/6869 435/6.12 |
| 11,173,018 B1 * | 11/2021 | O'Beirne | G16H 40/67 |
| 2004/0083570 A1 * | 5/2004 | Song | G05D 1/0274 15/340.1 |
| 2010/0021026 A1 * | 1/2010 | Collins | G06K 9/00 382/128 |
| 2013/0157279 A1 * | 6/2013 | Takoh | G01N 33/583 435/6.12 |
| 2015/0072594 A1 * | 3/2015 | Pasmooij | B08B 13/00 451/6 |
| 2015/0357189 A1 * | 12/2015 | Davis | H01L 29/1606 257/29 |

(Continued)

FOREIGN PATENT DOCUMENTS

| | | |
|---|---|---|
| JP | 2010-129966 | 6/2010 |
| JP | 2017-223474 | 12/2017 |

*Primary Examiner* — Anh-Tuan V Nguyen
(74) *Attorney, Agent, or Firm* — IPUSA, PLLC

(57) ABSTRACT

A contaminant detection system includes a light source configured to emit excitation light on an object to be inspected; a detector configured to detect fluorescence emitted from a contaminant adhering to the object to be inspected; and a processor. The fluorescence is caused by emission of the excitation light from the light source onto the object to be inspected. The processor is configured to perform a determination of a location of the contaminant and a type of the contaminant, based on the fluorescence emitted from the contaminant; and output a result of the determination.

17 Claims, 14 Drawing Sheets

(56) References Cited

U.S. PATENT DOCUMENTS

| | | | | |
|---|---|---|---|---|
| 2016/0093412 A1* | 3/2016 | Liao | ................... | G01N 21/6456 |
| | | | | 250/221 |
| 2017/0089841 A1* | 3/2017 | Uemura | ............. | G01N 21/8806 |
| 2018/0201231 A1* | 7/2018 | Tani | ......................... | B60S 1/54 |
| 2018/0328857 A1* | 11/2018 | Lee | ......................... | G06T 11/60 |
| 2019/0066284 A1* | 2/2019 | Jiang | ..................... | G06T 7/0004 |
| 2019/0284406 A1* | 9/2019 | Levine | ................. | A61K 8/8152 |
| 2019/0308762 A1* | 10/2019 | Suzuki | ................ | G01N 21/9018 |
| 2019/0339212 A1* | 11/2019 | Zhang | .................. | H04N 5/2256 |
| 2020/0024406 A1* | 1/2020 | Zhao | .................... | C08G 83/003 |
| 2021/0109036 A1* | 4/2021 | Iino | ........................... | G06T 7/11 |

* cited by examiner

CONTAMINANT DETECTION SYSTEM, CONTAMINANT DETECTING METHOD, AND SEMICONDUCTOR MANUFACTURING APPARATUS

CROSS-REFERENCE TO RELATED APPLICATIONS

This patent application is based on and claims priority to Japanese Patent Application No. 2020-074356 filed on Apr. 17, 2020, the entire contents of which are incorporated herein by reference.

TECHNICAL FIELD

The present disclosure relates to a contaminant detection system, a contaminant detecting method, programs, and a semiconductor manufacturing apparatus.

BACKGROUND

For example, in a conventional inspection apparatus for detecting foreign matter adhering to a container, an image of fluorescence emitted by contaminants was taken by irradiating the inner surface of the container with excitation light, and the foreign matter adhering to the inner surface of the container was detected from the image (see Patent Document 1, for example).

RELATED ART DOCUMENT

Patent Document

[Patent Document 1] Japanese Laid-open Patent Application Publication No. 2017-223474

SUMMARY

The present disclosure provides a technique for determining the location and type of a foreign matter adhering to an object to be inspected.

One aspect of the present disclosure is a contaminant detection system for detecting contaminants adhering to an object to be inspected. The contaminant detection system includes a light source configured to emit excitation light on the object to be inspected; a detector configured to detect fluorescence emitted from the contaminants adhering to the object to be inspected; and a processor. The fluorescence is caused by emission of the excitation light from the light source onto the object to be inspected. The processor is configured to perform a determination of the location of the contaminants and a type of the contaminant, based on the fluorescence emitted by the contaminants; and output a result of the determination.

DETAILED DESCRIPTION OF EMBODIMENTS

Hereinafter, embodiments for carrying out the present invention will be described with reference to the drawings. In the embodiments to be described below, examples of a contaminant detection system for detecting foreign material adhering to a semiconductor manufacturing apparatus will be described. However, a target to be inspected is not limited to a semiconductor manufacturing apparatus. The following embodiments are applicable to a variety of objects that are to be inspected for the presence of any foreign matter. Foreign matter mentioned in the embodiments of the present disclosure are contaminants, which emits fluoresces when irradiated with excitation light. Examples of the contaminants include organic contaminants, fat-based contaminants, ceramic-based contaminants, quartz-based contaminants, and metal oxide-based contaminants. Additional examples of the contaminants include particulate contaminants, stains with liquid deposits, and deposited (coated) stains.

First Embodiment

<System Configuration>

Figure 1:
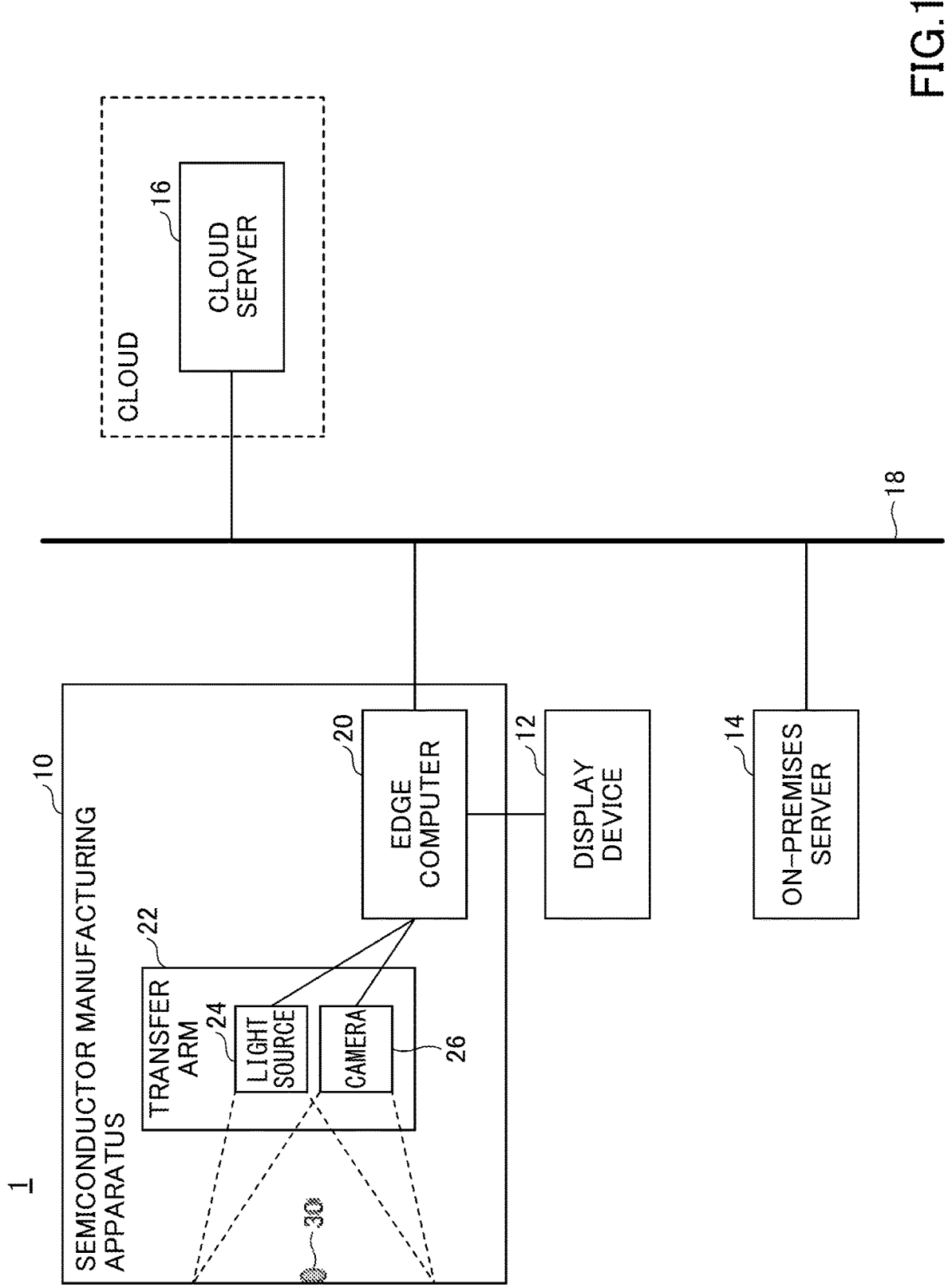
FIG. 1 is a diagram illustrating an example of the configuration of a contaminant detection system according to a first embodiment.

FIG. 1 is a diagram illustrating an example of the configuration of a contaminant detection system according to a first embodiment. The contaminant detection system 1 illustrated in FIG. 1 is configured by a semiconductor manufacturing apparatus 10, a display device 12, an on-premises server 14, and a cloud server 16, which are interconnected via a communicable network 18 such as a local area network (LAN).

The semiconductor manufacturing apparatus 10 is an example of an object to be inspected as to the presence of contaminants. In addition to the semiconductor manufacturing apparatus 10, a flat panel display (FPD) manufacturing device is also an example of the object to be inspected as to the presence of contaminants. In the semiconductor manufacturing apparatus 10, during a semiconductor manufacturing process or the like, adhesion of contaminants may occur, which may reduce the yield rate. Accordingly, a maintenance operation in the semiconductor manufacturing apparatus 10 is performed in order to avoid reductions in yield rate caused by contaminants.

Figure 2:
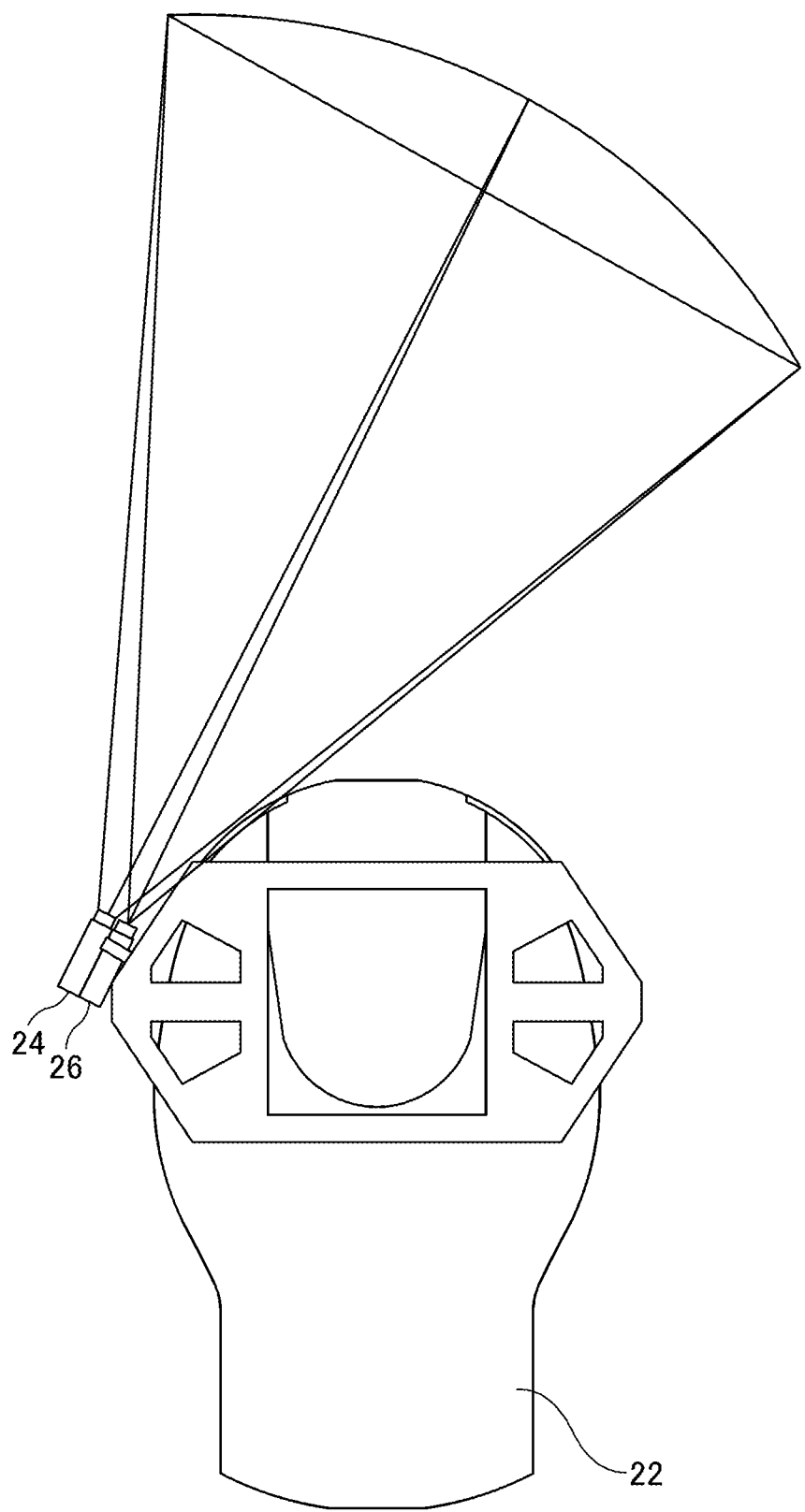
FIG. 2 is a diagram illustrating an example of an installation location of a light source and a camera.

The contaminant detection system 1 according to the present embodiment is provided with a light source 24 and a camera 26, which are used to visualize contaminants adhering to the semiconductor manufacturing apparatus 10 during maintenance work. FIG. 1 illustrates a case in which the light source 24 and the camera 26 are installed on a transfer arm 22 used for transporting a substrate within the semiconductor manufacturing apparatus 10. The light source 24 and the camera 26 may be disposed on (attached to) the transfer arm 22, as illustrated in FIG. 2. Alternatively, the light source 24 and the camera 26 may be installed at a robotic arm other than the transfer arm 22. FIG. 2 is a diagram illustrating an example of an installation location of the light source 24 and the camera 26 seen from an opposite side of the surface of the transfer arm 22 on which a substrate is placed.

A location at which the light source 24 and the camera 26 are installed is not limited to the transfer arm 22. The light source 24 and the camera 26 may be installed within the semiconductor manufacturing apparatus 10 in a stationary manner or movably, or may be installed outside the semiconductor manufacturing apparatus 10 in a stationary manner or movably. The light source 24 and the camera 26 may also be provided on a head-mounted display (HMD) such as augmented reality (AR) glasses for which AR can be utilized, or in a device that can be held by a technician performing the maintenance operation.

The light source 24 emits excitation light onto a region in which presence of contaminants is to be inspected. In the following description, the region in which presence of contaminants is to be inspected may be referred to as an "inspection target area". The light source 24 may include, for example, a UV light. The light source 24 may be configured by Polarion light that filters out light in a visible light range of 400 nm or greater wavelength with a filter or a special glass called wood glass. The light source 24 may also employ a light emitting diode. The inspection target area may be inside or outside the semiconductor manufacturing apparatus 10.

The excitation light is a generic term for light that causes excitation of a substance. Ultraviolet (UV) light is an example of the excitation light. When excitation light is emitted on a substance such as a contaminant 30, the substance fluoresces after the substance transits to the excitation state by absorbing energy of the excitation light and when the substance returns to the ground state.

The camera 26 captures the inspection target area on which the excitation light is emitted. For example, if a material such as the contaminant 30 adheres to the inspection target area, the camera 26 can capture fluorescence emitted from the contaminant 30 in response to exposure to the excitation light.

An edge computer 20 determines the location of the contaminant 30 and identifies the type of the contaminant 30 adhering to the inspection target area, based on the fluorescence captured by the camera 26. Details of processes of determining the location of the contaminant 30 and the type of the contaminant 30 adhering to the inspection target area based on the fluorescence captured by the camera 26 will be described below. The edge computer 20 stores the determination results of the location of the contaminant 30 adhering to the inspection target area and the type of the contaminant 30 into a storage section. The edge computer 20 outputs (performs display control of) the determination results of the location of the contaminant 30 adhering to the inspection target area and the type of the contaminant 30, to the display device 12.

The display device 12 displays the determination results of the location of the contaminant 30 adhering to the inspection target area and the type of the contaminant 30, which is obtained by the edge computer 20. The display device 12 may be implemented by a computer monitor or a head-mounted display device. The head-mounted display device is a display device attached to the head of a technician. In addition, by using an AR technique, the display device 12 can display, as a virtual image, an image on which the determination results of the location of the contaminant 30 adhering to the inspection target area and the type of the contaminant 30 are superimposed on an actual image of the inspection target area. The image (i.e., virtual image) on which the determination results of the location of the contaminant 30 adhering to the inspection target area and the type of the contaminant 30 are superimposed on the actual image of the inspection target area can be used, for example, as a screen for maintenance work (may also be referred to as a "maintenance screen") viewed by a technician during his/her maintenance work. Details of the maintenance screen will be described below.

Part or all of the above-described processes of the edge computer 20 may be performed by the on-premises server 14 or the cloud server 16 that is communicably connected to the edge computer 20 via the network 18.

For example, in the contaminant detection system 1 of FIG. 1, control of the light source 24 and the camera 26, display control of images to be displayed on the display device 12, determination of the location and type of the contaminant 30 adhering to the inspection target area, and maintenance work support, may be performed by the edge computer 20, and storage of the determination results of the location and type of the contaminant 30 adhering to the inspection target area, and storage of information for analysis of a maintenance work history, may be performed by the on-premises server 14 or the cloud server 16. Also, at least one of the on-premises server 14 and the cloud server 16 may be omitted.

The on-premises server 14 is an example of a server computer in an on-premises environment. The cloud server 16 is an example of a server computer in a cloud computing environment. Further, as the configuration of the contaminant detection system 1 illustrated in FIG. 1 is an example, it is needless to say that there are various examples of the system configuration depending on the application and purpose of the contaminant detection system 1. The configuration of the contaminant detection system 1 as illustrated in FIG. 1, in which the semiconductor manufacturing apparatus 10, the edge computer 20, the on-premises server 14, and the cloud server 16 are present, is also an example.

For example, the contaminant detection system 1 may be configured such that the edge computer 20 is omitted and that the above-mentioned functions of the edge computer 20 is implemented by the on-premises server 14 or the cloud server 16. In addition, the contaminant detection system 1 of FIG. 1 may further be divided. The contaminant detection system 1 may take various other configurations. Alternatively, a single on-premises server 14 or cloud server 16 may perform functions of the edge computers 20 in the respective semiconductor manufacturing apparatuses 10.

<Hardware Configuration>

Figure 3:
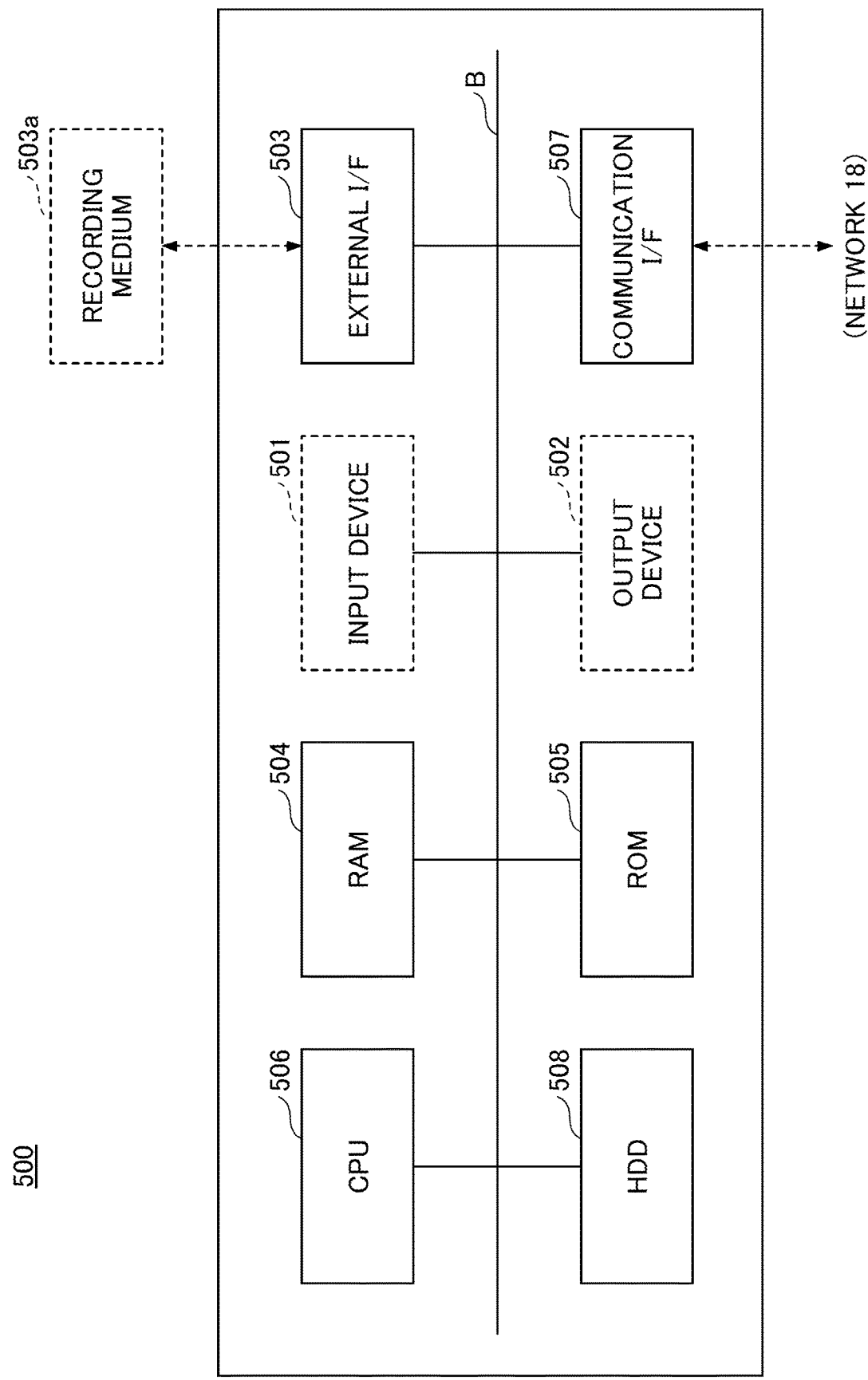
FIG. 3 is an example of the hardware configuration diagram of a computer.

The on-premises server 14, the cloud server 16, and the edge computer 20 in the contaminant detection system 1 illustrated in FIG. 1 are implemented by, for example, a computer 500 having the hardware configuration as illustrated in FIG. 3. FIG. 3 is an example of the hardware configuration diagram of the computer 500.

The computer 500 illustrated in FIG. 3 includes an input device 501, an output device 502, an external interface (I/F) 503, a random access memory (RAM) 504, a read only memory (ROM) 505, a processor such as a central processing unit (CPU) 506, a communication I/F 507, and a hard disk drive (HDD) 508, each of which is interconnected by a bus B. The input device 501 and the output device 502 may be connected and utilized when necessary.

The input device 501 may be a keyboard, mouse, touch panel, or the like, and is used by a technician to input each operation signal. The output device 502 is a display or the like, and displays the results of processing by the computer 500. The communication I/F 507 is an interface for connecting the computer 500 to the network 18. The HDD 508 is an example of a non-volatile storage device (storage section), which stores programs and data.

The external I/F 503 is an interface with an external device. The computer 500 may read and/or write data from/to a recording medium 503a, such as a Secure Digital (SD) memory card, via the external I/F 503. The computer 500 can perform display control of the display device 12, such as a head-mounted display, through the external I/F 503. The ROM 505 is an example of a non-volatile semiconductor memory (storage device) in which programs and data are stored. The RAM 504 is an example of a volatile semiconductor memory (storage device) that temporarily retains programs and data.

The CPU 506 is an arithmetic processing device that realizes overall control of the computer 500 and realizes functions of the computer 500, by loading programs and data into the RAM 504 from the storage devices, such as the ROM 505 and the HDD 508, and by executing the programs.

Various functions of the on-premises server 14, the cloud server 16, and the edge computer 20 in the contaminant detection system 1 illustrated in FIG. 1 can be implemented by the hardware components of the computer 500 illustrated in FIG. 3.

<Determination of Location and Type of Contaminant Adhering to Inspection Target Area>

Figure 4A:
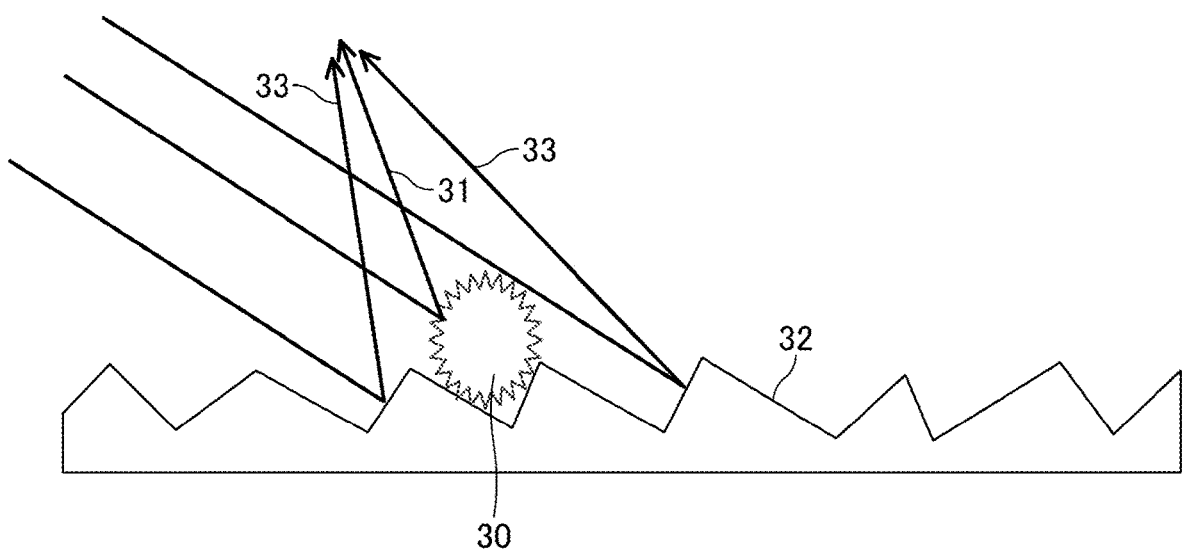
FIGS. 4A and 4B are diagrams illustrating visualization of a contaminant adhering to an inspection target area.
Figure 4B:
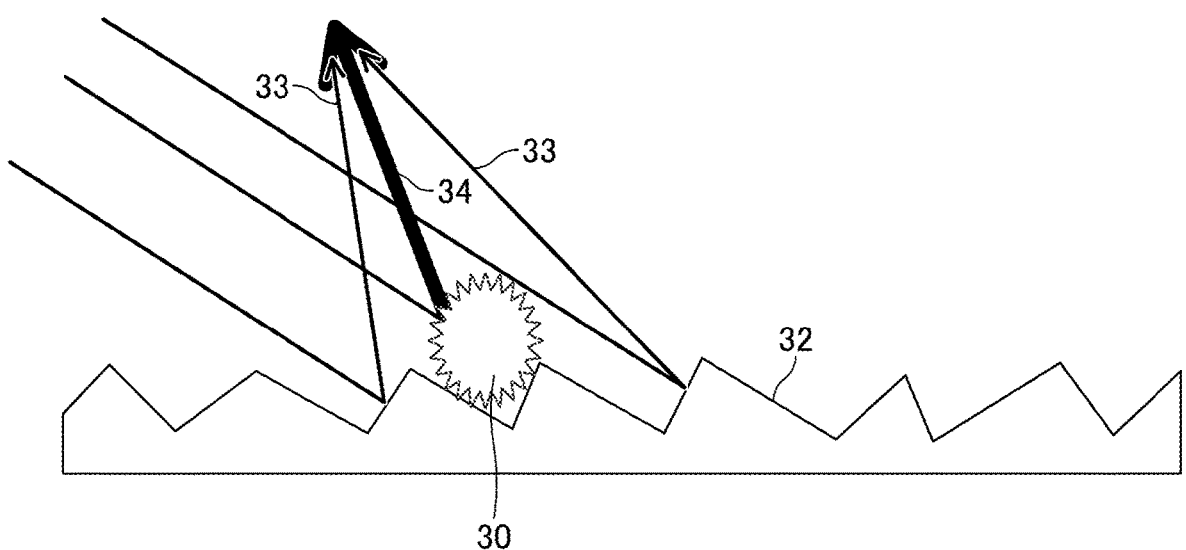

The determination of the location and type of the contaminant 30 adhering to the inspection target area can be performed as follows, for example. FIGS. 4A and 4B are diagrams illustrating visualization of a contaminant adhering to an inspection target area. Generally, an event in which the contaminant 30 can be seen by a person is a phenomenon in which light is reflected by the contaminant 30 and in which a person recognizes the light 31 reflected by the contaminant 30 (may also be referred to as "reflected light 31").

As the size of the contaminant 30 becomes smaller, the intensity of the reflected light 31 decreases, as illustrated in FIG. 4A. Therefore, the difference between the intensity of the reflected light 31 and the intensity of the light 33 reflected by the surface 32, such as a wall surface, becomes smaller, and thus the reflected light 31 cannot be recognized easily by a person such as a technician.

FIG. 4B illustrates a case of radiating, on the contaminant 30, ultraviolet light which is invisible light, as excitation light. The contaminant 30, on which ultraviolet light as the excitation light is radiated, absorbs the ultraviolet light and emits fluorescence, which is visible light, as the reflected light 34. Because the light 33 reflected by the surface 32, such as a wall surface, is ultraviolet light which is invisible, the reflected light 34 from the contaminant 30, which is visible light, is conspicuously visible, and the contaminant 30 can be easily recognized by a person such as a technician. As described above, in the contaminant detection system 1 according to the present embodiment, the location of the contaminant 30 adhering to the inspection target area can be determined by observing the reflected light 34 from the contaminant 30, which is visible light.

The color (wavelength) of fluorescence emitted from the contaminant 30 that is irradiated with ultraviolet light as the excitation light depends on the composition of the contaminant 30 (type of the contaminant 30). Accordingly, in the present embodiment, by using the mapping information as illustrated in FIG. 5, which represents a correlation between color (wavelength) of emitted fluorescence and a set of a type of a contaminant and a cleaning method suitable for the type of the corresponding contaminant 30, the type of the contaminant 30 and the cleaning method suitable for the type of the contaminant 30 are determined from the color (wavelength) of the fluorescence emitted from the contaminant 30.

Figure 5:
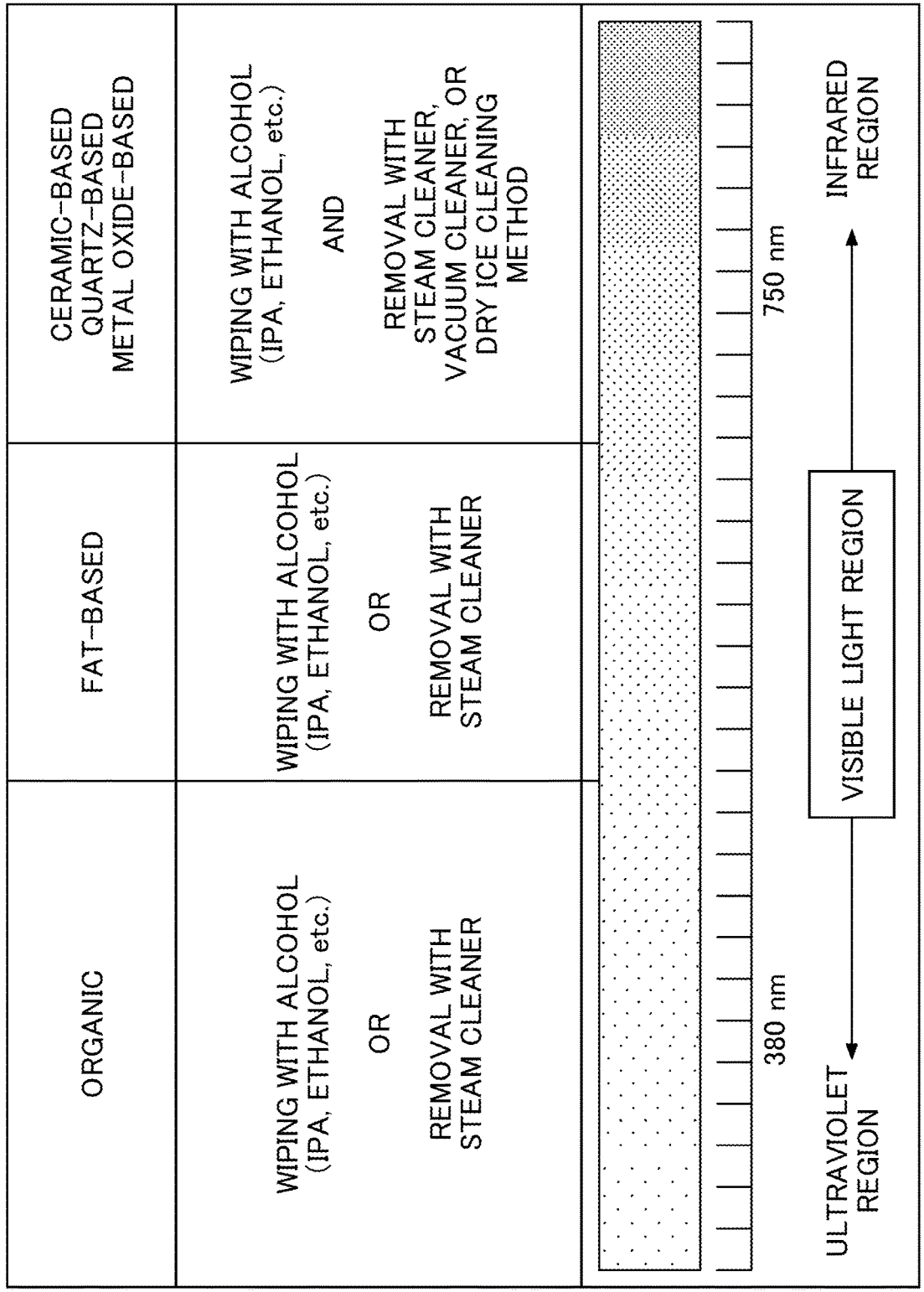
FIG. 5 is a diagram illustrating an example of information representing mappings between color of emitted fluorescence and a set of a type of a contaminant and a cleaning method suitable for the type of the contaminant.

FIG. 5 is a diagram illustrating an example of information representing mappings between color (wavelength) of emitted fluorescence and a set of a type of a contaminant and a cleaning method suitable for the type of the contaminant. FIG. 5 illustrates an example in which, if the wavelength of emitted fluorescence is smaller than 500 nm, the type of the contaminant 30 is "organic" and the cleaning method suitable for the type of the contaminant 30 is "wiping with alcohol (IPA, ethanol, etc.), or removal with a steam cleaner".

FIG. 5 also illustrates an example in which, if the wavelength of emitted fluorescence is equal to or longer than 500 nm and shorter than 610 nm, the type of the contaminant 30 is "fat-based" and the cleaning method suitable for the type of the contaminant 30 is "wiping with alcohol (IPA, ethanol, etc.), or removal with a steam cleaner". In addition, FIG. 5 illustrates an example in which, if the wavelength of emitted fluorescent is equal to or longer than 610 nm, the type of the contaminant 30 is "ceramic-based, quartz-based, or metal oxide-based" and the cleaning method suitable for the type of the contaminant 30 is "wiping with alcohol (IPA, ethanol, etc.) and removal with a steam cleaner, vacuum cleaner, or dry ice cleaning method". The cleaning methods illustrated in FIG. 5 are well-known techniques. For example, cleaning methods described in Japanese Laid-open Patent Application Publication No. 2010-129966 may be used. In Japanese Laid-open Patent Application Publication No. 2010-129966, as methods of cleaning a semiconductor manufacturing apparatus, cleaning by wiping with a non-woven cloth using ethanol and dry wiping, cleaning with a cleaning apparatus for a semiconductor manufacturing apparatus using steam (e.g., steam cleaner), and the like, are described. The vacuum cleaner is a cleaning apparatus for a semiconductor manufacturing apparatus, which draws contaminants 30. In addition, dry ice cleaning is a cleaning method in which dry ice particles are sprayed on contaminants 30 for removal.

In addition, the intensity of fluorescence emitted from the contaminant 30 irradiated with ultraviolet light as excitation light depends on the size of the contaminant 30. Accordingly, in the present embodiment, for example, the intensity of fluorescence emitted from a contaminant 30 of a reference size when excitation light is radiated onto the contaminant 30 of a reference size is measured in advance. In the present embodiment, this intensity of fluorescence is referred to as "reference size intensity". When the size of a certain contaminant 30 is to be determined, the intensity of fluorescence emitted from the certain contaminant 30 is measured by radiating excitation light onto the certain contaminant 30, and by comparing the intensity of fluorescence measured from the certain contaminant 30 with the reference size intensity, the size of the certain contaminant 30 is determined.

<Functional Configuration>

Figure 6:
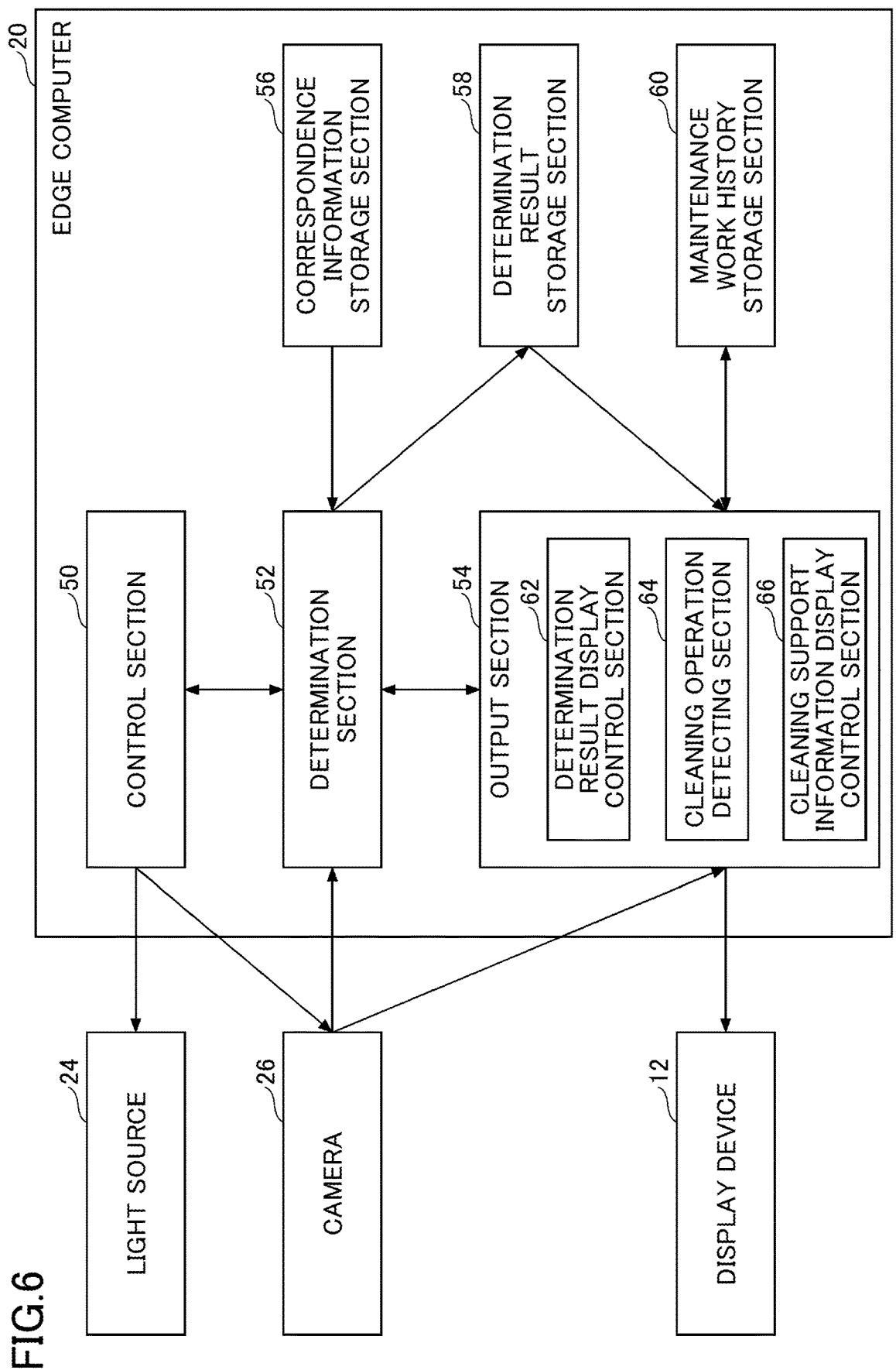
FIG. 6 is an example of a functional block diagram illustrating functional blocks implemented in an edge computer of the contaminant detection system according to the first embodiment.

In the edge computer 20 of the contaminant detection system 1 according to the present embodiment, for example, multiple functional blocks illustrated in FIG. 6 are implemented. FIG. 6 is an example of a functional block diagram illustrating the functional blocks implemented in the edge computer of the contaminant detection system according to the present embodiment. In the functional block diagram illustrated in FIG. 6, illustration of functional elements that are not necessary for the description of the present embodiment is omitted.

The processor in the edge computer 20 executes a program for the edge computer 20 to realize a control section 50, a determination section 52, an output section 54, a correspondence information storage section 56, a determination result storage section 58, and a maintenance work history storage section 60.

The control section 50 controls an entirety of processes of contaminant detection and maintenance work support according to the present embodiment. For example, the control section 50 controls operations of the light source 24 to emit excitation light onto an inspection target area, and controls operations of the camera 26 to capture an image of the inspection target area irradiated with the excitation light.

The determination section 52 receives image data of the image captured by the camera 26. If a contaminant 30 is adhering to the inspection target area, the image captured by the camera 26 includes fluorescence emitted by the contaminant 30. The determination section 52 analyzes the image data received from the camera 26, to determine the location of the contaminant 30 adhering to the inspection target area by recognizing the fluorescence included in the image of the inspection target area.

Further, by using the mapping information as illustrated in FIG. 5, which is stored in the correspondence information storage section 56, the determination section 52 determines the type of the contaminant 30 and the cleaning method suitable for the type of the contaminant 30, based on the color (wavelength) of the fluorescence included in the image of the inspection target area. After the determination section 52 determines the location of the contaminant 30 adhering to the determined inspection target area, the type of the contaminant 30, and the cleaning method suitable for the type of the contaminant 30, the determination section 52 stores the determined location of the contaminant 30 adhering to the determined inspection target area, the type of the contaminant 30, and the cleaning method suitable for the type of the contaminant 30 into the determination result storage section 58.

The output section 54 includes a determination result display control section 62, a cleaning operation detecting section 64, and a cleaning support information display control section 66. The determination result display control section 62 displays the location of the contaminant 30 adhering to the inspection target area, the type of the contaminant 30, and a cleaning method suitable for the type of the contaminant 30, which have been determined by the determination section 52, on the display device 12, as the determination result.

The cleaning operation detecting section 64 uses motion capture or the like to detect movement of a technician. For example, the movement of hands of the technician performing a cleaning work is detected. The cleaning support information display control section 66 displays a maintenance screen on the display device 12 to support a maintenance work by a technician. In the maintenance screen, for example, an area in the actual image of the inspection target area, to which a contaminant 30 is adhering, is colored. Accordingly, the area in which cleaning is required can be indicated to a technician.

Further, based on the result of detection performed by the cleaning operation detecting section 64, the cleaning support information display control section 66 estimates progress of the cleaning work of the technician, and indicates the progress of the cleaning work to the technician on the maintenance screen by gradually decoloring an area where the cleaning support information display control section 66 estimates that the cleaning work is completed, or by gradually changing the color of an area where the cleaning support information display control section 66 estimates that the cleaning work is completed. When it is determined (estimated) that cleaning of the entire area is completed, information indicating the completion of cleaning of the area is displayed on the maintenance screen to inform the technician of the completion of cleaning. The completion of cleaning may also be reported to the technician by voice. The output section 54 stores information about the maintenance work performed by the technician into the maintenance work history storage section 60 as information for analysis of the maintenance work history.

<Flow of Processing>

Figure 7:
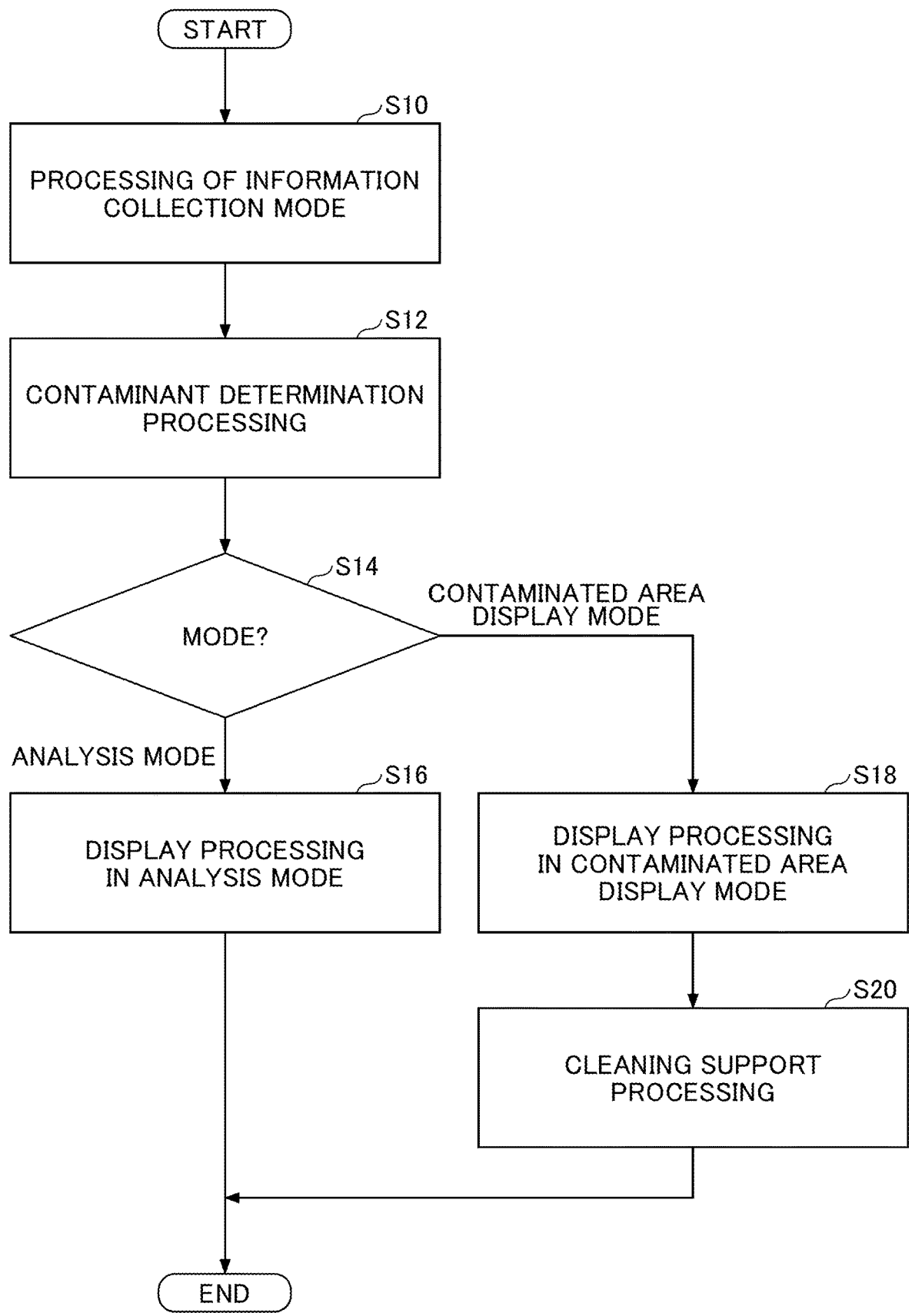
FIG. 7 is a flowchart illustrating an example of processing performed by the contaminant detection system according to the first embodiment.

FIG. 7 is a flowchart illustrating an example of processing performed by the contaminant detection system according to the present embodiment. For example, a technician who performs the maintenance work operates the edge computer 20 to activate an information collection mode on the edge computer 20. When the edge computer 20 receives, from the technician, the operation to activate the information collection mode, the edge computer 20 starts processing of the information collection mode (step S10).

Figure 8:
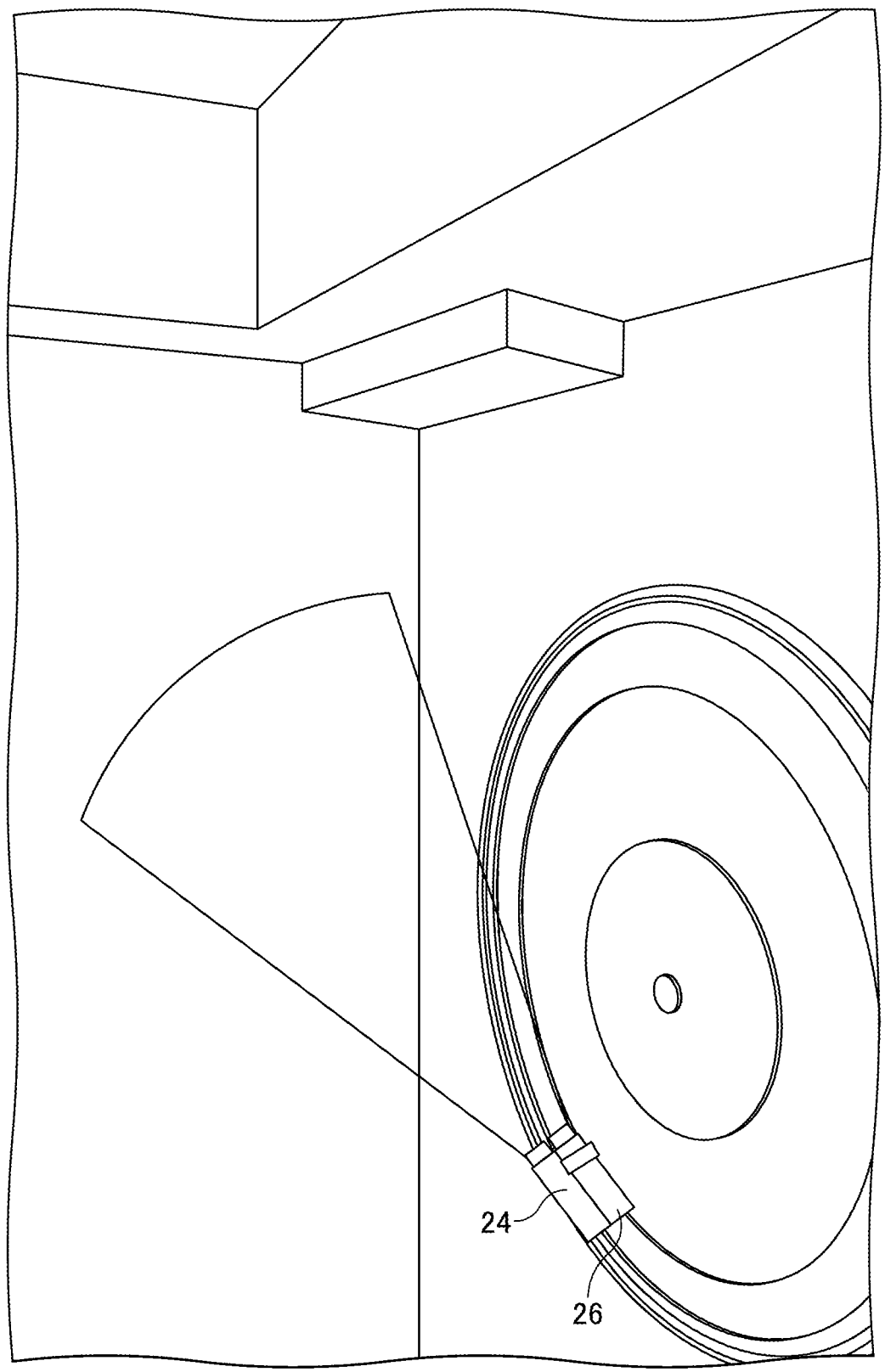
FIG. 8 is a schematic view illustrating an example of the inspection target area in which a contaminant detection is performed.

Here, a case in which an inspection target area is the interior of the semiconductor manufacturing apparatus 10 is described. The control section 50 of the edge computer 20 controls operations of the light source 24 to radiate excitation light on the interior of the semiconductor manufacturing apparatus 10 (inspection target area) as illustrated in FIG. 8, for example. FIG. 8 is a schematic view illustrating an example of the inspection target area in which a contaminant detection is performed. The control section 50 also controls operations of the camera 26 so as to capture images of the inspection target area on which the excitation light is radiated.

There are various ways in which the light source 24 and the camera 26 may be installed. For example, when the light source 24 and the camera 26 installed in the transfer arm 22 are used as illustrated in FIG. 2, the control section 50 controls (i.e., moves the position of) the transfer arm 22 such that excitation light is radiated on the inspection target area and that images of the inspection target area on which the excitation light is radiated is captured. Alternatively, if the light source 24 and the camera 26 are installed within the semiconductor manufacturing apparatus 10 so as to be movable, the control section 50 controls a lighting direction of the light source 24 so as to emit excitation light to the inspection target area, and controls a photographing direction of the camera 26 so as to capture the inspection target area on which the excitation light is radiated. In the case of using the light source 24 and the camera 26 mounted on a hand-held device used by a technician, the technician adjusts the orientation of the hand-held device so that the excitation light is directed to the inspection target area and images of the inspection target area on which the excitation light is radiated can be appropriately captured.

Figure 9:
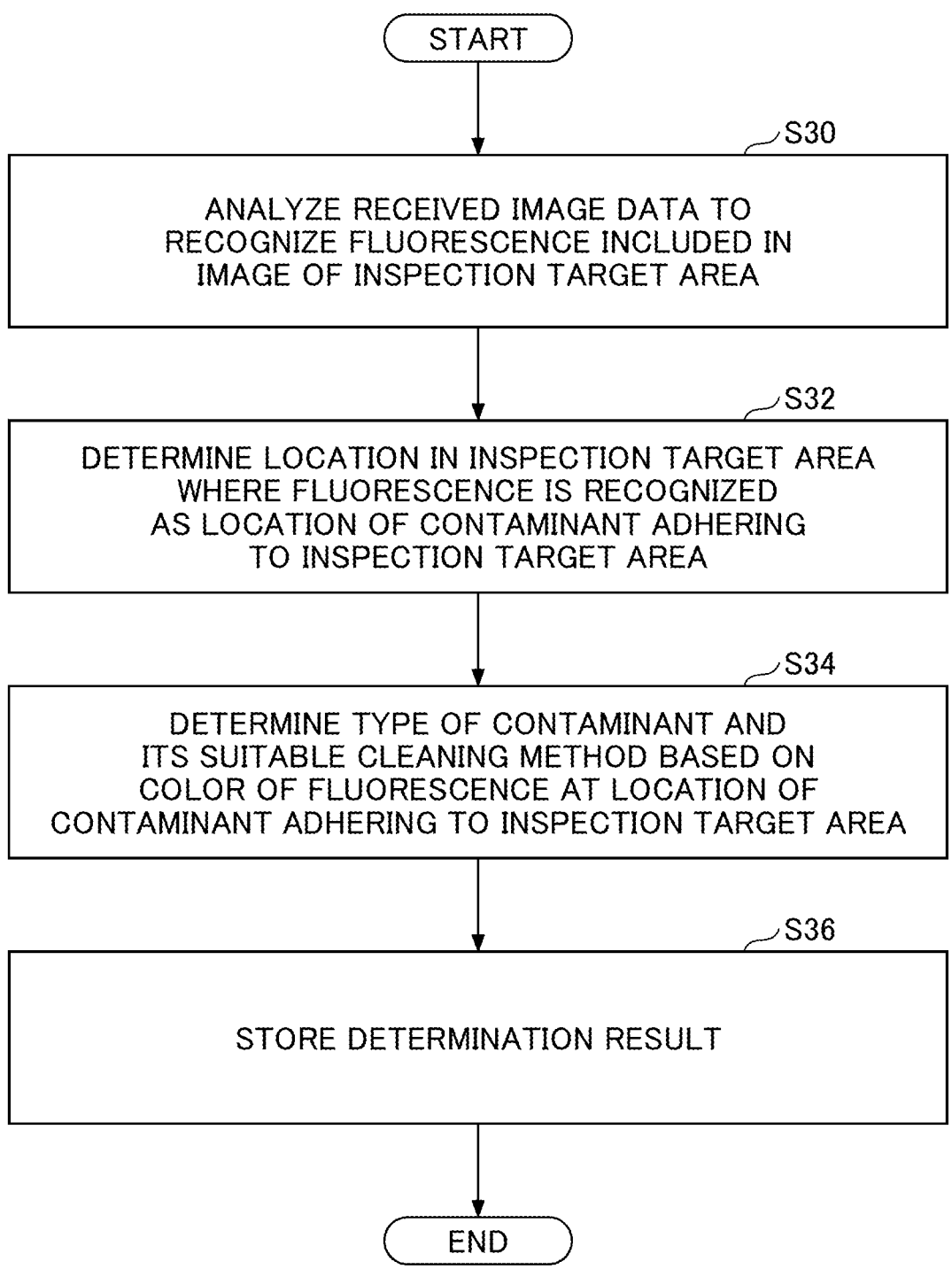
FIG. 9 is a flowchart illustrating an example of contaminant determination processing.

In step S12, the determination section 52 of the edge computer 20 receives image data of the image captured by the camera 26 (i.e., image of an inspection target area on which excitation light is radiated), and performs contaminant determination processing according to the procedure illustrated in FIG. 9.

FIG. 9 is a flowchart illustrating an example of the contaminant determination processing. In step S30, the determination section 52 analyzes the image data captured by the camera 26, to recognize emission of fluorescence contained in the image of the inspection target area that is illuminated by the excitation light. The determination section 52 may exclude fluorescence emitted from an object other than the contaminant 30 from the image data captured by the camera 26, by comparing the image data captured by the camera 26 with image data of an image of the inspection target area on which the excitation light is radiated when no contaminant is present in the inspection target area.

In step S32, the determination section 52 determines a location in the image of the inspection target area, from which the fluorescence is emitted, as the location of the contaminant 30 adhering to the inspection target area. In step S34, the determination section 52 determines the type of the contaminant 30 adhering to the inspection target area and a cleaning method suitable for the type of the contaminant 30, based on the color (wavelength) of the fluorescence at the location of the contaminant 30 determined in step S32, and based on the mapping information in FIG. 5.

In step S36, the determination section 52 stores the image data captured by the camera 26, the location of the contaminant 30 determined in step S32, the type of the contaminant 30 determined in step S34, and the cleaning method suitable for the type of the contaminant 30 determined in step S34, into the determination result storage section 58.

After completion of the processing of the information collection mode in step S10 and the contaminant determination processing in step S12, the technician can perform, for example, an operation to activate, in the edge computer 20, an analysis mode or a contaminated area display mode (step S14). In a case in which the determination result display control section 62 of the edge computer 20 receives the operation to activate the analysis mode from the technician in step S14, the edge computer 20 starts display processing in the analysis mode (step S16).

Figure 10:
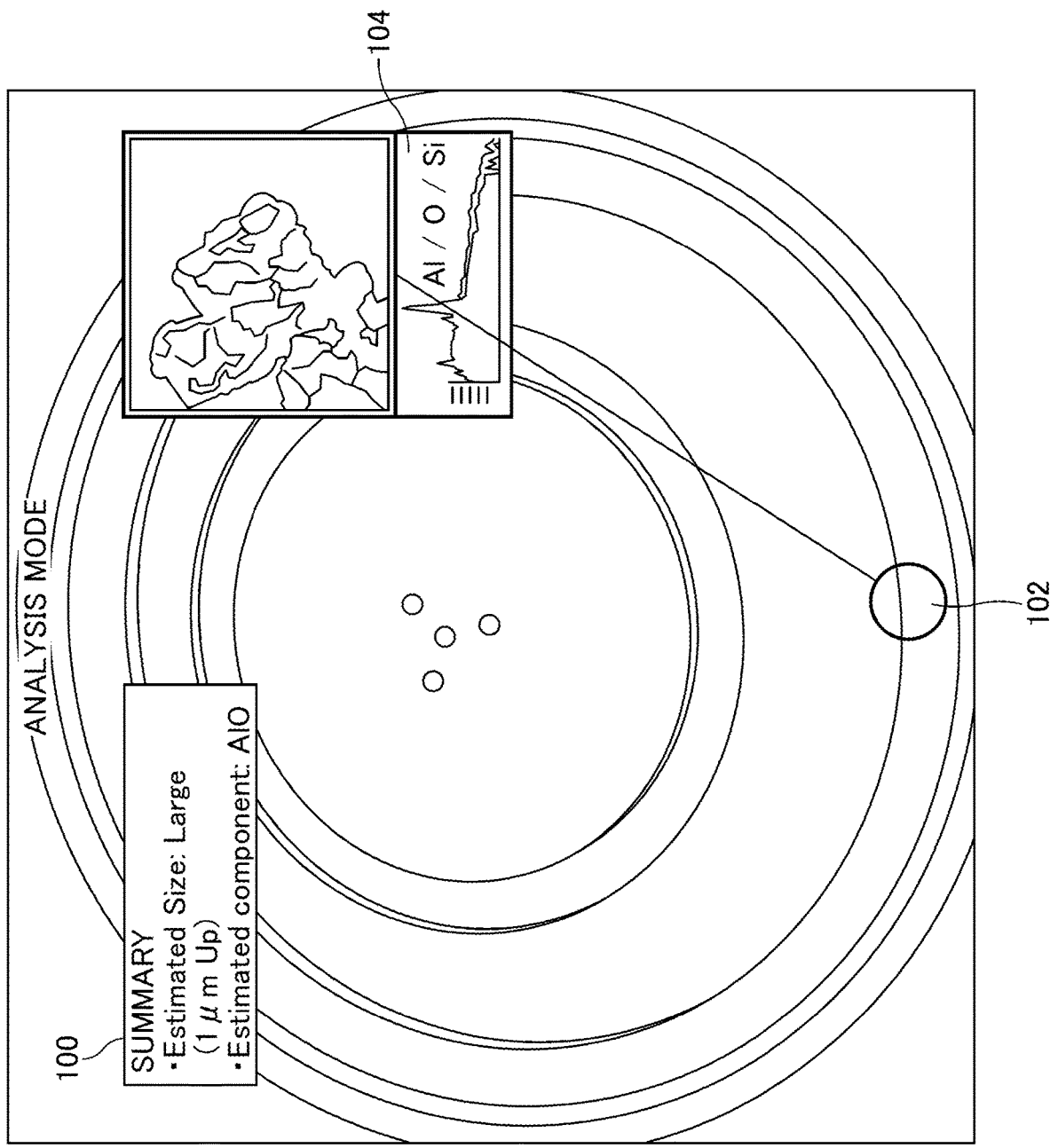
FIG. 10 is a schematic view illustrating an example of an analysis screen.

In the display processing in the analysis mode of step S16, the determination result display control section 62 causes the display device 12 to display, for example, an analysis screen as illustrated in FIG. 10, in order to output (display), as a determination result, the location of the contaminant 30 adhering to the inspection target area and the type of the contaminant 30 determined by the determination section 52.

FIG. 10 is a schematic view illustrating an example of the analysis screen. In the analysis screen of FIG. 10, the estimated size and composition (type) of the contaminant 30 are displayed on an information box 100, and an area 102 to which the contaminant 30 is adhering is colored. In the analysis screen of FIG. 10, a representative image 104 corresponding to the estimated contaminant 30 may be displayed by referring to an external database or the like.

In a case in which the determination result display control section 62 receives an operation to activate the contaminated area display mode from the technician in step S14, the determination result display control section 62 starts, in step S18, display processing in the contaminated area display mode. The determination result display control section 62 causes the display device 12 to display a contaminated area display mode screen, using the image data captured by the camera 26 and stored in the determination result storage section 58, the location of the contaminant 30 determined in step S32, the type of the contaminant 30 determined in step S34, and the cleaning method suitable for the type of the contaminant 30 determined in step S34.

Figure 11:
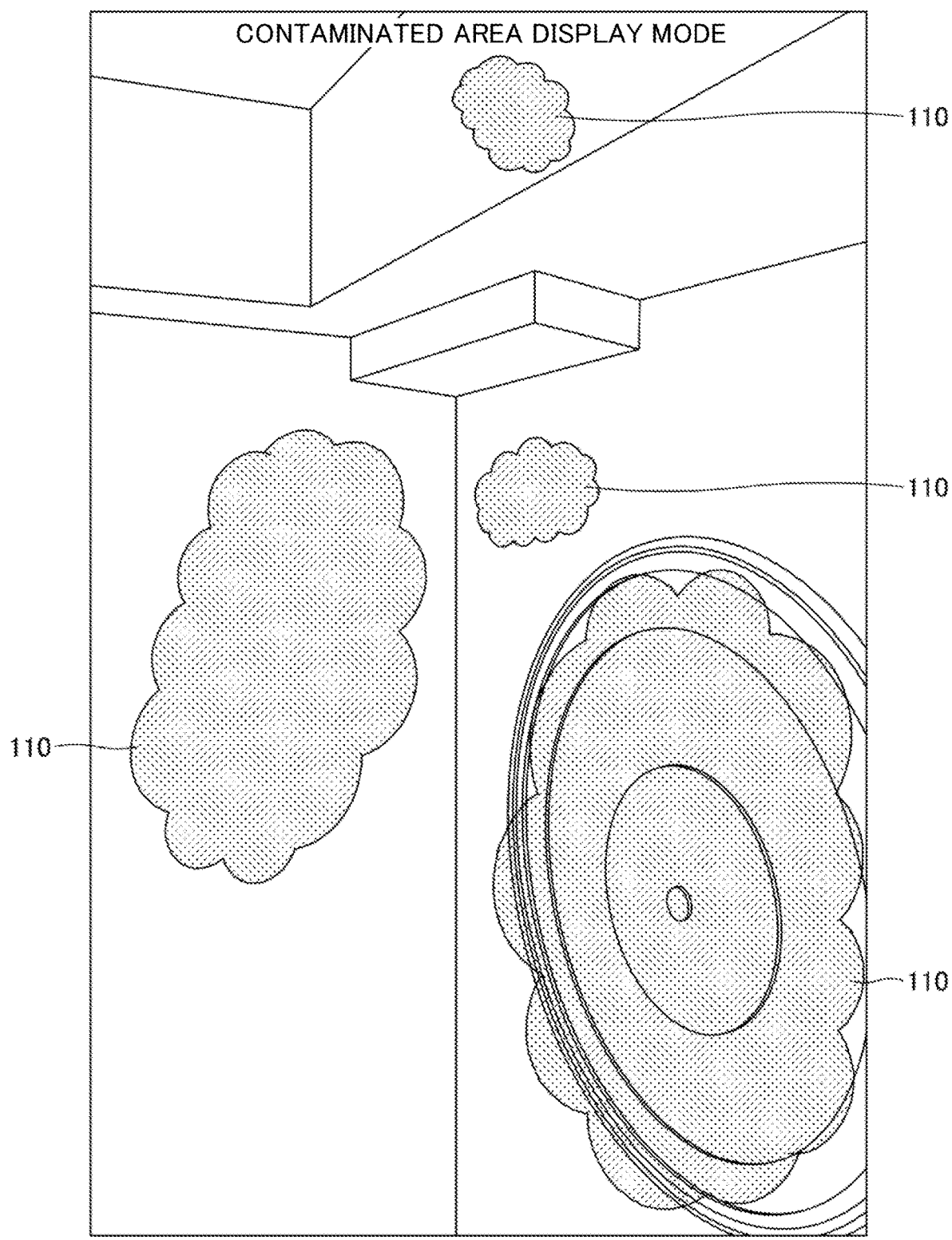
FIG. 11 is a schematic view illustrating an example of a contaminated area display mode screen.

FIG. 11 is a schematic view illustrating an example of the contaminated area display mode screen. The contaminated area display mode screen of FIG. 11 illustrates an example of a screen made by superimposing an image including multiple colored areas 110 indicating areas to which the contaminants 30 are adhering, on the actual image of the inspection target area illustrated in FIG. 8. On the contaminated area display mode screen of FIG. 11, the types of the contaminants 30 adhering to the respective colored areas 110 and the cleaning methods suitable for the respective types of contaminants 30 may further be displayed.

For example, if the display device 12 is a head-mounted display, the contaminated area display mode screen as illustrated in FIG. 11 is displayed in the technician's sight. As the technician approaches any one of the areas 110 displayed on the contaminated area display mode screen, the edge computer 20 enters a cleaning support mode (step S20), to start cleaning support processing.

Figure 12:
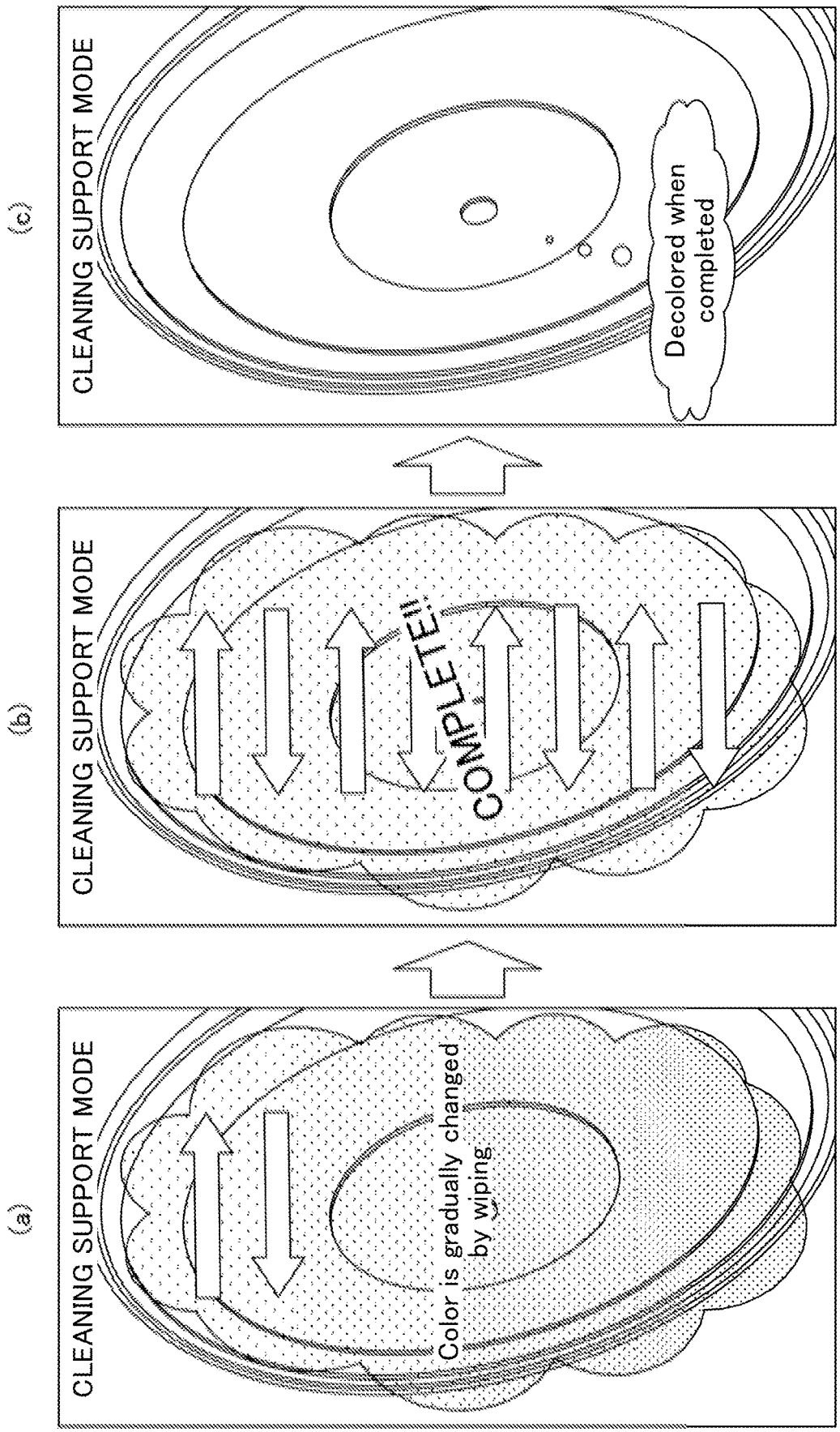
FIG. 12 is a schematic view illustrating an example of transition of a cleaning support mode screen.

The cleaning support information display control section 66 causes the display device 12, such as a head-mounted display, to display a cleaning support mode screen for the area 110 that the technician approaches. FIG. 12 is a schematic view illustrating an example of transition of the cleaning support mode screen.

The cleaning support mode screen of FIG. 12 illustrates an example in which the area 110 that the technician approaches is displayed in an enlarged view. The cleaning operation detecting section 64 uses motion capture or the like to detect the movement of the technician (for example, the movement of the technician's hand during cleaning work). The cleaning support information display control section 66 estimates the progress of the cleaning work for the area 110, based on the movement of the technician's hand detected by the cleaning operation detecting section 64. As illustrated in the diagram (a) of FIG. 12, the cleaning support information display control section 66 changes color of a portion of the area 110, which is estimated (determined) that the cleaning work has been completed, from a first color (e.g., red) indicating that the cleaning work has not been completed to a second color (e.g., green) different from the first color indicating that the cleaning work has been completed.

When the entirety of the area 110 is changed to the second color (e.g., green) indicating that the cleaning work has been completed, the cleaning support information display control section 66 informs of the technician the completion of the cleaning work of the area 110, by displaying, for example, information indicating that the cleaning work of the area 110 has been completed, as illustrated in the diagram (b) of FIG. 12. Thereafter, as the result of the processing in steps S10 and S12 of FIG. 7 that is performed again, if it is determined that the contaminant 30 has been removed, the cleaning support information display control section 66 changes the color of the area 110 to a third color, as illustrated in the diagram (c) of FIG. 12. The third color may be transparent, or may be a color other than the first and second colors.

As described above, in the contaminant detection system 1 according to the present embodiment, the location and type of the contaminant 30 adhering to the inspection target area can be determined. In addition, it is possible to support the technician's cleaning work for cleaning the contaminant 30 of the determined type and adhering to the determined location.

In addition, in the contaminant detection system 1 according to the present embodiment, types of contaminants 30 to be detected can be limited by providing a filter in front of the lens of the camera 26 to select a wavelength range to be captured by the camera 26. For example, in the example of the mapping information of FIG. 5, if a filter (optical filter) is provided in front of the lens of the camera 26 to filter out light of a wavelength range (color range) other than the fluorescence emitted from the organic contaminants 30, a mode for displaying only areas to which the organic contaminants 30 are adhering can be realized. As described above, in the contaminant detection system 1 according to the present embodiment, a mode in which types of the contaminant 30 are narrowed down and only locations to which the narrowed-down contaminants 30 are adhering are displayed may be realized. An RGB filter may be provided in front of the lens of the camera 26 to select a color (red, green, or blue; RGB) to be captured by the camera 26, so as to select a wavelength range to be captured by the camera 26.

Second Embodiment

The first embodiment has described an example in which a technician performs the cleaning work of the contaminant 30 based on the information displayed on the display device 12. However, if there is a cleaning unit including a cleaning mechanism such as a robot arm, which is capable of performing cleaning work of the inspection target area using the cleaning mechanism, the contaminant detection system may be configured to cause the cleaning unit to perform the cleaning work of the contaminant 30. Because the second embodiment is the same as the first embodiment except for a part thereof, the description of the same part will not be repeated.

Figure 13:
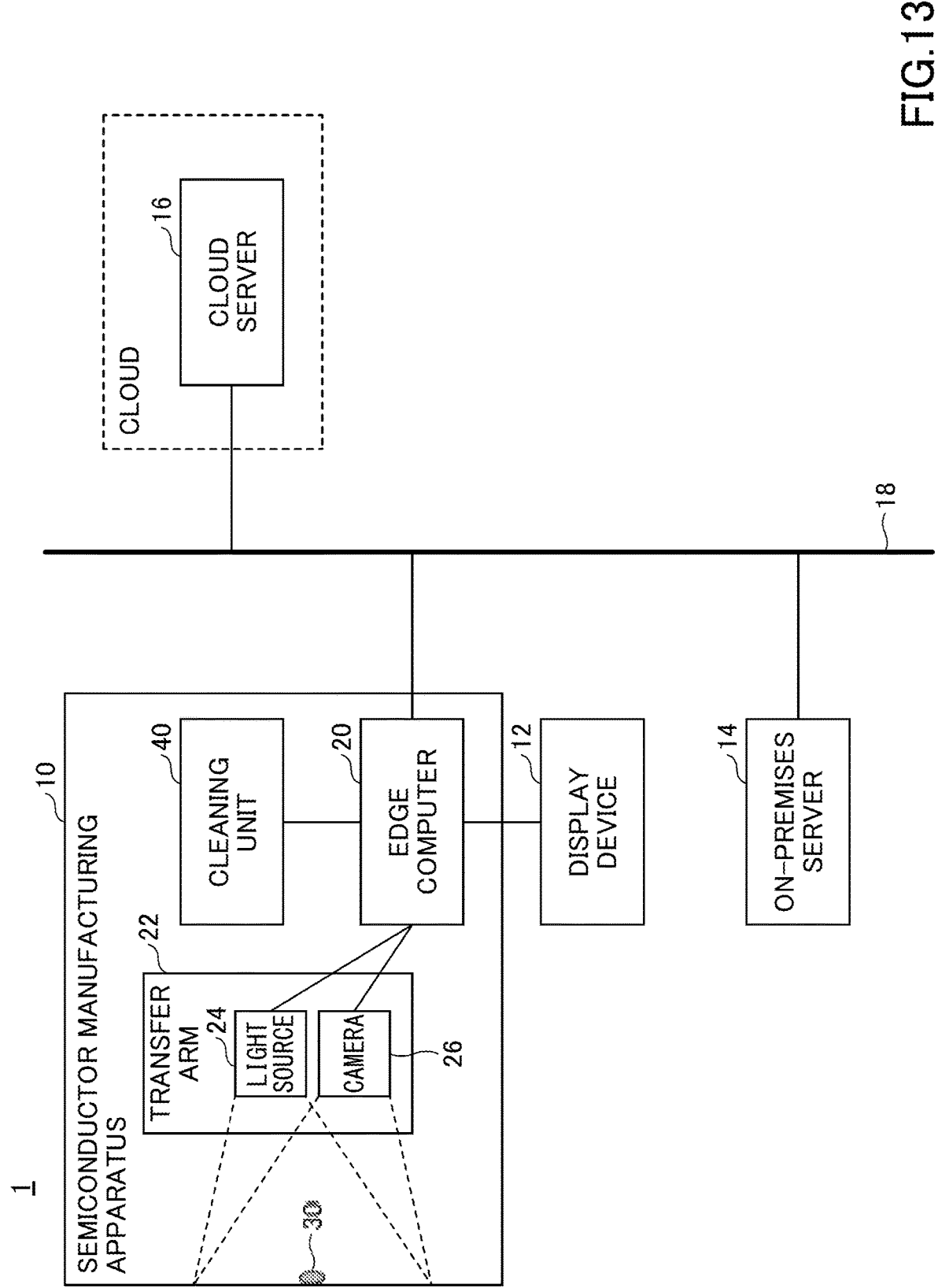
FIG. 13 is a configuration diagram illustrating an example of a contaminant detection system according to a second embodiment.

FIG. 13 is a configuration diagram illustrating an example of a contaminant detection system according to the second embodiment. The contaminant detection system 1 illustrated in FIG. 13 has the configuration in which a cleaning unit 40 is added to the contaminant detection system 1 illustrated in FIG. 1. The cleaning unit 40 receives, from the edge computer 20, information including the location of the contaminant 30 adhering to the inspection target area, the type of the contaminant 30, and the cleaning method suitable for the type of the contaminant 30, and performs cleaning work based on the received information.

Figure 14:
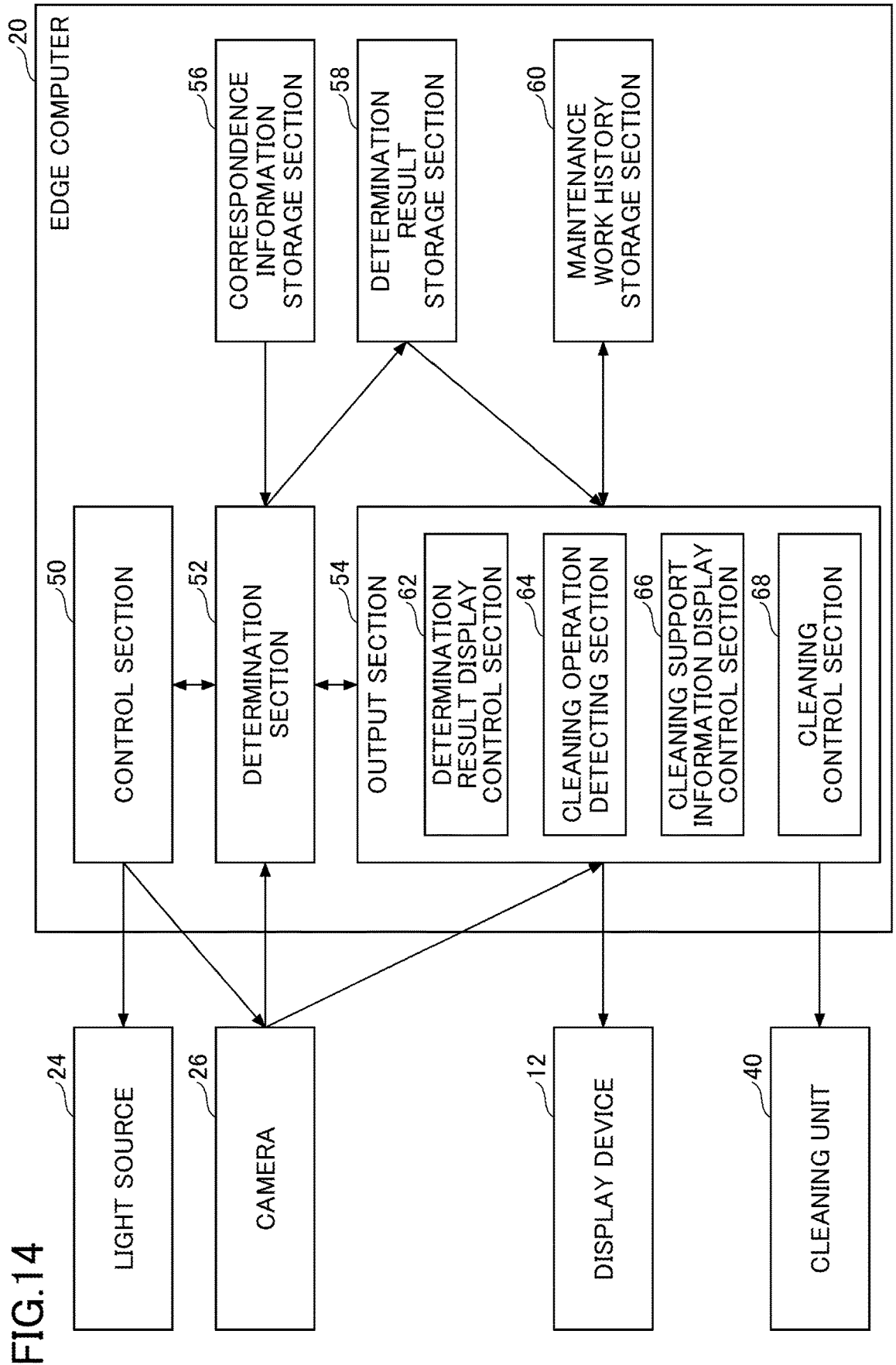
FIG. 14 is an example of a functional block diagram illustrating functional blocks implemented in the edge computer of the contaminant detection system according to the second embodiment.

FIG. 14 is an example of a functional block diagram illustrating functional blocks implemented in the edge computer of the contaminant detection system according to the present embodiment. In the functional block diagram illustrated in FIG. 14, the cleaning unit 40 and a cleaning control section 68 are added to the functional block diagram illustrated in FIG. 6.

The cleaning control section 68 transmits the information including the location of the contaminant 30 adhering to the inspection target area, the type of the contaminant 30, and the cleaning method suitable for the type of the contaminant 30, which are determined by the determination section 52, to the cleaning unit 40, to control the cleaning work performed by the cleaning unit 40. Alternatively, the cleaning control section 68 may control the cleaning work performed by the cleaning unit 40 by transmitting control commands to the cleaning unit 40 in accordance with the location of the contaminant 30 adhering to the inspection target area, the type of the contaminant 30, and the cleaning method suitable for the type of the contaminant 30, determined by the determination section 52.

As described above, according to the second embodiment, the cleaning work performed by a technician can be reduced or eliminated. Thus, the risk of contamination by foreign matters caused by a technician entering the semiconductor manufacturing apparatus 10 can be reduced.

According to the above-described embodiments, contaminants adhering to an object to be inspected, such as the semiconductor manufacturing apparatus 10, can be efficiently detected, and the maintenance work for cleaning off the contaminants can be efficiently performed.

While the specific embodiments of the invention have been described in detail above, the invention is not limited to the particulars of the above-described embodiments, and various modifications and substitutions can be made to the above-described embodiments without departing from the scope of the invention.

The light source 24 is an example of a light source described in the claim. The camera 26 is an example of a detector described in the claims. The determination section 52 is an example of a determination section described in the claims. The output section 54 is an example of an output section described in the claims. The display device 12 is an example of a display device described in the claims. The cleaning operation detecting section 64 is an example of a detecting unit described in the claim. The cleaning unit 40 is an example of a cleaning unit described in the claims.

What is claimed is:

1. A contaminant detection system comprising:
    a light source configured to emit excitation light on an object to be inspected;
    a camera configured to detect fluorescence emitted from a contaminant adhering to the object to be inspected, the fluorescence being caused by exposure to the excitation light from the light source;
    a display device; and
    a processor configured to
        perform a determination of a location of the contaminant and a type of the contaminant, based on the fluorescence emitted from the contaminant;
        output a result of the determination;
        cause the display device to display the location of the contaminant adhering to the object and the type of the contaminant, as the result of the determination;
        during a cleaning work of the object by a user, cause the display device to display a first location on the object, to which the contaminant is adhering, in a first color, the first location being subject to cleaning by the cleaning work; and
        during the cleaning work of the object by the user, cause the display device to display at least a portion of the first location as a second location by changing a color from the first color to a second color, the at least a portion of the first location having already been cleaned by the user, the second color being a color different from the first color; and wherein the processor is further configured to perform the determination on the second location; and
in response to the result of the determination that no contamination is present, cause the display device to display a third location on the object, in a third color different from the first color and the second color, the third location being at least a portion of the second location determined to be free of the contaminant.

2. The contaminant detection system according to claim 1, wherein
the contaminant detection system stores mapping information indicating a correlation between a color of fluorescence emitted from a contaminant and a type of the contaminant; and
the processor is configured to, in performing the determination, determine the type of the contaminant based on the mapping information and a color of the fluorescence emitted from the contaminant.

3. The contaminant detection system according to claim 1, wherein the processor is further configured to determine a size of the contaminant adhering to the object to be inspected, by comparing intensity of the fluorescence emitted from the contaminant adhering to the object to be inspected, with intensity of fluorescence emitted from a reference contaminant of a reference size in response to emitting excitation light onto the reference contaminant of the reference size.

4. The contaminant detection system according to claim 3, wherein
the processor is configured to cause the display device to display the size of the contaminant adhering to the object, as the result of the determination.

5. The contaminant detection system according to claim 1, wherein
the contaminant detection system stores mapping information indicating a correlation between a color of fluorescence emitted from a contaminant and a set of a type of the contaminant and a cleaning method suitable for the type of the contaminant; and
the processor is further configured to
perform a determination of a cleaning method of removing the contaminant adhering to the object based on the mapping information and a color of the fluorescence emitted from the contaminant; and
cause the display device to display the cleaning method of removing the contaminant adhering to the object as the result of the deteimination.

6. The contaminant detection system according to claim 1, wherein
the processor is configured to cause the display device to display a virtual image generated by superimposing the result of the determination on an actual image of the object, by using an augmented reality technique.

7. The contaminant detection system according to claim 1, wherein
the processor is further configured to
detect movement of the user during the cleaning work;
perform a determination as to whether the first location is cleaned by the user, based on the movement of the user; and
in response to the determination that the first location is cleaned by the user, cause the display device to change the first color of the first location into the second color.

8. The contaminant detection system according to claim 1, wherein the processor is further configured to
cause the display device to display information indicating completion of the cleaning work, in response to determination that the cleaning work of an entirety of the object has been completed.

9. The contaminant detection system according to claim 1, further comprising a cleaning unit including a cleaning mechanism, wherein
the processor is configured to output the result of the determination to the cleaning unit, to cause the cleaning unit to remove the contaminant adhering to the object.

10. The contaminant detection system according to claim 9, wherein
the contaminant detection system stores mapping information indicating a correlation between a color of fluorescence emitted from a contaminant and a set of a type of the contaminant and a cleaning method suitable for the type of the contaminant;
the processor is further configured to
determine a cleaning method of removing the contaminant adhering to the object based on the mapping information and a color of the fluorescence emitted from the contaminant; and
output the cleaning method determined by the processor to the cleaning unit; and
the cleaning unit is configured to remove the contaminant adhering to the object in accordance with the cleaning method received from the processor.

11. The contaminant detection system according to claim 1, wherein
the camera includes an optical filter configured to select a wavelength range of light of the fluorescence detected by the camera.

12. The contaminant detection system according to claim 1 wherein the excitation light is ultraviolet light.

13. The contaminant detection system according to claim 1, wherein the processor is further configured to determine the fluorescence emitted from the contaminant based on a comparison of fluorescence emitted from the object to be inspected to which the contaminant is not adhering and fluorescence emitted from the object to be inspected to which the contaminant is adhering.

14. A method of detecting a contaminant adhering to an object to be inspected, the method being performed by contaminant detection system, and the method comprising:
emitting excitation light on the object to be inspected;
detecting fluorescence emitted from the contaminant adhering to the object to be inspected, the fluorescence being caused by exposure to the excitation light;
performing a determination of a location of the contaminant and a type of the contaminant, based on the fluorescence emitted from the contaminant;
outputting a result of the determination;
displaying the location of the contaminant adhering to the object and the type of the contaminant, as the result of the determination;
during a cleaning work of the object by a user, displaying a first location on the object, to which the contaminant is adhering, in a first color, the first location being subject to cleaning by the cleaning work; and
during the cleaning work of the object by the user, displaying at least a portion of the first location as a second location by changing a color from the first color to a second color, the at least a portion of the first location having already been cleaned by the user, the second color being a color different from the first color; and the method further comprising:
performing the determination on the second location; and
in response to the result of the determination that no contamination is present, displaying a third location on the object, in a third color different from the first color and the second color, the third location being at least a portion of the second location determined to be free of the contaminant.

15. A non-transitory computer-readable recording medium storing a computer program that causes a processor in a computer to perform a method comprising:
emitting excitation light on an object to be inspected;
detecting fluorescence emitted from a contaminant adhering to the object to be inspected, the fluorescence being caused by exposure to the excitation light from the light source;
performing a determination of a location of the contaminant and a type of the contaminant, based on the fluorescence emitted from the contaminant;
outputting a result of the determination;
displaying the location of the contaminant adhering to the object and the type of the contaminant, as the result of the determination;
during a cleaning work of the object by a user, displaying a first location on the object, to which the contaminant is adhering, in a first color, the first location being subject to cleaning by the cleaning work; and
during the cleaning work of the object by the user, displaying at least a portion of the first location as a second location by changing a color from the first color to a second color, the at least a portion of the first location having already been cleaned by the user, the second color being a color different from the first color; and the method further comprising:
performing the determination on the second location; and
in response to the result of the determination that no contamination is present, displaying a third location on the object, in a third color different from the first color and the second color, the third location being at least a portion of the second location determined to be free of the contaminant.

16. The semiconductor manufacturing apparatus comprising the contaminant detection system according to claim 1.

17. The semiconductor manufacturing apparatus according to claim 16, further comprising a transfer arm; wherein the light source and the camera are provided on the transfer arm.

* * * * *